United States Patent [19]

Nguyen et al.

[11] Patent Number: 5,229,033
[45] Date of Patent: Jul. 20, 1993

[54] POLYBUTENE BASED FOAM CONTROL COMPOSITIONS FOR AQUEOUS SYSTEMS

[75] Inventors: Duy T. Nguyen; Mitzi K. Fader; William A. Hendriks, all of Jacksonville, Fla.

[73] Assignee: Betz PaperChem, Inc., Jacksonville, Fla.

[21] Appl. No.: 651,160

[22] Filed: Feb. 6, 1991

[51] Int. Cl.$^5$ .................. B01D 17/00; B01D 19/04
[52] U.S. Cl. ................................ 252/358; 252/321
[58] Field of Search ............................ 252/321, 358

[56] References Cited

U.S. PATENT DOCUMENTS

| | | | |
|---|---|---|---|
| 3,652,453 | 3/1972 | MacDonnell | 252/358 |
| 3,677,963 | 7/1972 | Lichtman et al. | 252/358 |
| 3,705,859 | 12/1972 | Boylan | 252/321 |
| 3,705,860 | 12/1972 | Duvall | 252/358 |
| 3,723,342 | 3/1973 | Shane et al. | 252/358 |
| 3,935,121 | 1/1976 | Lieberman et al. | 252/321 |
| 3,959,175 | 5/1976 | Smith, Jr. et al. | 252/321 |
| 4,451,390 | 5/1984 | Flannigan | 252/321 |
| 4,950,420 | 8/1990 | Svarz | 252/321 |
| 5,045,232 | 9/1991 | Dahanayake | 252/321 |

OTHER PUBLICATIONS

Chemical Abstract 87:103470d.
Derwent Publication: J4909977 Abstract, Sep. 20, 1974.
*McCutcheon's Detergents & Emulsifiers*, (1973 N. American Ed.) Allured Publishing Corp., Ridgewood, N.J. p. 129.

*Primary Examiner*—Robert L. Stoll
*Assistant Examiner*—Daniel S. Metzmqier
*Attorney, Agent, or Firm*—Alexander D. Ricci; Gregory M. Hill

[57] ABSTRACT

A composition to control foam in aqueous systems such as those found in papermaking operations comprising a polybutene and at least one surfactant having a melting or pour point below 20° C. The surfactants include polyethylene glycol esters, sorbitan ester, polyoxyalkylene ester, oleic diethanolamide and block copolymers of ethylene oxide and propylene oxide. Due to their low melting point, these surfactants may be blended with the polybutene at room temperature resulting in a foam control composition that is translucent, resistant to deposition and highly effective.

5 Claims, No Drawings

POLYBUTENE BASED FOAM CONTROL COMPOSITIONS FOR AQUEOUS SYSTEMS

FIELD OF THE INVENTION

The present invention relates to foam control compositions, their preparation and use in aqueous systems. These foam control compositions are particularly effective in pulp and paper processing and in the treatment of effluent water.

BACKGROUND OF THE INVENTION

Foam causes serious operating problems in pulp and paper mills. It is particularly troublesome in the paper machine white water stage of the operation. Lack of adequate foam control in the pulp slurry may result in the curtailment of production or diminished product quality.

Foam is a colloidal system in which a gas is dispersed in a liquid. Foam can either exist as bubbles of entrained air in the bulk medium or as a combination of entrained gases and surface foam. Foams are thermodynamically unstable but are stabilized by two mechanisms:

1. The adsorption at the air/water interface of surface active materials such as salts of rosin acids, fatty acids and lignin.
2. The concentration of finely divided solid particles around each bubble such as starch, cellulose, fines, fillers, etc.

Foam in residual black pulping liquor is believed to be stabilized primarily by the first mechanism; whereas foam in paper machine white water is stabilized primarily by the second mechanism.

Defoamers, which, when added to a foaming liquid, prevent the formation of bubbles or cause small bubbles to coalesce are well known to those skilled in the art. Two different theories, dewetting and surfactant adsorption, have been used to explain lamella rupture by these hydrophobic materials. In the dewetting mechanism, the hydrophobic particle enters the air-liquid surface in the lamella. When the lamella drains sufficiently, due to gravitational and capillary forces, the particle dewets through both sides of the lamella which causes a hole in the film and in turn initiates rupture. The contact angle between the film and the particle as well as the particle size and shape are very important in the dewetting mechanism.

In the surfactant adsorption mechanism, the hydrophobic particle enters the aqueous phase through the lamella surface; it then adsorbs a layer of surfactant which leaves an area of the surface depleted of surfactant and is rendered susceptible to rupture due to mechanical, gravitational or capillary forces. This mechanism is debatable because it is known that the lamella can "heal" quickly via the Marangoni Effect. Thus the dewetting mechanism is believed to be more generally applicable.

Most conventional defoamers comprise a hydrophobic material having a melting point greater than 40° C. or an insoluble material such as silica, dispersed in an oil phase. The production of these compositions requires the separate steps of heating and cooling. Due to the use of high melting point hydrophobic materials, the resulting composition quickly becomes unstable and the propensity for deposition in the treated aqueous system is very high.

It is one object of the present invention to provide an improved foam control composition and method of using same in pulp and paper processing. It is a further object to obviate the necessity of having to process the composition at elevated temperatures. Still further objects are to produce a foam control composition that remains stable before use and which will reduce deposition potential in the treated system.

GENERAL DESCRIPTION OF THE INVENTION

The foam control composition of the present invention comprises polybutene in combination with at least one surfactant having a melting point or pour point lower than 20° C. This composition can be formulated at room temperature with no heating and cooling required. The blending of the carefully chosen individual components results in a foam control agent that is translucent, indicating complete blending, a characteristic which facilitates foam control function. Furthermore, such a composition is stable for at least three months, well beyond the product destabilization time exhibited by conventional treatment compositions. The foam control composition is added to aqueous systems and is particularly effective at controlling foam generated in the white water of paper making operations.

RELATED ART

Many conventional foam control programs contain silicone based compositions. Such a program is exemplified by U.S. Pat. No. 3,705,860, Duvall, and is characterized by a composition containing a non-polar oil, precipitated microfine silica, a metallo-organic catalyst, polymethylsiloxane and a microcrystalline paraffin wax. Processing requires heating the mixture to 110°-130° C. to insure adequate blending of the individual chemical species.

U.S. Pat. No. 3,723,342, Shane et al, discloses a defoamer for use in pulp mill operations comprising a silicone compound, as above, in the form of a silicone oil blended with an aliphatic diamide, a low viscosity mineral oil and a spreading agent, such as a surfactant. The preferable silicone oil is dimethyl polysiloxane.

An improvement in the Shane et al process is disclosed by U.S. Pat. No. 3,935,121, Lieberman et al. The composition of this process contains an amide, a liquid hydrocarbon carrier, an emulsifier and a silicone oil. In the preparation of the defoamer composition, the individual components must be heated in order to obtain a clear melt. As shown in Example 1, the temperature required was 250° F.

A variation on the above treatment programs may be found in U.S. Pat. No. 3,959,175, Smith, Jr. et al. The patentees disclose a defoamer composition and method of use thereof in an aqueous system comprising polybutene mixed with other components such as surfactants, at least one of which must have a relatively high melting point. The defoamer may be prepared by either of two methods. In the first, the various constituents are added together under mechanical agitation and homogenization to produce minute particles. In the second, the constituents are heated to about 120° C. and then allowed to cool after which the high melting material will precipitate out in small particle size. The common denominator in either case is the inclusion of high melting materials and a resulting defoamer composition containing minute or precipitated particles.

DETAILED DESCRIPTION OF THE INVENTION

In accordance with the present invention, and as the primary object thereof, the ability of polybutene to reduce foaming, particularly in white water, is considerably enhanced by combining it with at least one surfactant having a melting point or pour point less than 20° C. These surfactants can include but are not limited to polyethylene glycol ester, sorbitan ester, polyoxyalkylene ester or oleic diethanolamide. Furthermore, triglycerides such as herring oil or soybean oil may be added. This invention can be formulated at room temperature with no heating or cooling required.

The following mechanism is proposed to explain why this novel defoamer works so effectively in the foaming medium, especially white water. It appears that for a surfactant type defoamer to work, it must diffuse rapidly to the air/liquid interface and then spread quickly and thoroughly on the film surface. In the process, it is believed that the liquid in the film is displaced by rapidly diffusing noncohesive molecules, and the film thins to the point of mechanical instability. FIG. 1 schematically illustrates such a mechanism. Interestingly, it was found that incorporating the polybutene with at least one of the nonionic surfactants mentioned above, provides a large area/molecule (115A$^2$ vs. 60A$^2$ for conventional defoamers) at the liquid/air interface thus forming a loosely packed noncoherent film that produces unstable foam. This formulation also has a low surface tension (approximately 28.0 dyne/cm), and low interfacial tension <1.0 dyne/cm which give rise to a positive spreading coefficient. Loose packing of the surfactant molecule in the film increases the rate of diffusion of the gas between bubbles. As the rate of diffusion increases, large bubbles tend to grow at the expense of smaller ones. This process is known as the Oswald ripening process. This change to large polyhedral cells from small spherical air cells increases the curvature in the Plateau borders and increases the forces causing drainage into these borders, thus destabilizing the foam.

FIG. 1: Proposed Defoaming Mechanism

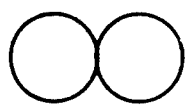

(a)

(b)

(c)

(a) droplet entered into air/foam surface
(b) diffuse and spreads the surface
(c) film rupture The number average molecular weight of the polybutene disclosed in this invention can vary from 300 to 3,000. Even though the efficacy for different molecular weights of polybutene are comparable, a polybutene of molecular weight below 400 is preferred since a translucent and stable solution is formed when combined with nonionic surfactants. Many polyethylene glycol esters are commercially available. Characteristic examples are available from the Mazer Chemical Company as PEG 200 dioleate (DO), PEG 200 ditallate (DT), PEG 400 dioleate (DO), PEG 400 ditallate (DT), PEG 600 dioleate (DO), and PEG 600 ditallate (DT). The sorbitan ester is selected from POE(20) sorbitan trioleate. The polyoxyalkylene ester may be derived from polyoxyalkylene oleic acid which has the following structure:

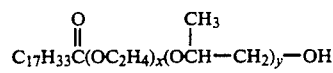

or, polyoxyalkylene dioleic acid which has the following structure:

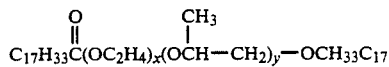

wherein x can be from 1-10 and y can be from 0 to 35 moles.

Block copolymers of ethylene oxide and propylene oxide such as PLURONIC ® L81 and PLURONIC ® L92 are also useful.

The composition can be made simply by mixing the ingredients (i.e. polybutene, surfactants) thoroughly at ambient temperature. If desired, the mixture can be further diluted to 10% with water. The latter emulsion is stable for up to 3 weeks, the former for about 3 months.

When a polybutene is used with one or more surfactants having a pour point or melting point lower than 20° C. (e.g. PEG 600 DO), the product solidifies or freezes at 10°-20° C. This high freezing point limits the use of this product. However, the addition of 1-15% water blended at room temperature, lowers the freezing point significantly, such as to less than 5° C., probably due to the microemulsion formation or association of water molecules with surfactant molecules. Furthermore, the addition of water does not have a detrimental effect on physical stability.

To illustrate the efficacy of the invention, synthetic paper machine white water is used as the foaming medium. The medium is circulated from a calibrated reservoir (in centimeters) via a pump and is returned back to the reservoir. This action agitates the medium which, in turn, causes foam. A known amount of the defoamer to be treated is introduced into the test cell before the pump is turned on. The calibration of the test cell ranges from 0 to 295 cm; the medium usually occupies the first 145 cm. A longer time required for the foam to reach a certain level indicates a better defoamer. The time is recorded when the foam reaches the 290 cm level.

The relative amounts of the individual components of the present defoamer composition is as follows (values are in percent by weight):

| Component | Suitable | Preferred |
| --- | --- | --- |
| Polybutene | 5 to 80 | 10 to 60 |
| Surfactant(s) | 20 to 95 | 40 to 90 |
| Refined herring oil (when present) | 1 to 70 | 30 to 60 |
| Soybean oil (when present) | 1 to 70 | 30 to 60 |
| Water (when present) | 1 to 15 | 5 to 10 |

An example of a formulation in which water is added to lower the freezing point of the final product would include the following relative amounts (again, in percent by weight):

| Component | Range |
| --- | --- |
| Polybutene | 5 to 79 |
| Surfactant(s) | 20 to 94 |
| Water | 1 to 15 |

Exemplary surfactants and their relative concentrations, as expressed in percent by weight of the total defoamer composition are as follows:

| Surfactant | Suitable | Preferred |
| --- | --- | --- |
| PEG 400 DO | 5 to 20 | 5 to 15 |
| PEG 600 DO | 10 to 80 | 20 to 70 |
| Oleic Diethanolamide | 1 to 20 | 5 to 10 |
| Pluronic L-92 | 1 to 35 | 5 to 30 |

The compositions of this process use inexpensive, commercially available raw materials and eliminate the need for hydrophobic materials having a high melting point. This negates the need for extensive manufacturing requirements and costs.

EXAMPLE 1

Synthetic white water contains the following ingredients with respect to percentage by volume as listed:

| | | |
| --- | --- | --- |
| Tap Water | 25% | |
| Deionized Water | 73% | |
| 5% Rosin | 1% | |
| 5% Starch | 0.4% | |
| 3% $Al_2(SO_4)_3 \cdot 13H_2O$ | 0.5% | |
| 37% Formaldehyde | 0.03% | |
| Cellulose | 0.07% | |
| pH = 6.1–6.4 | | |

The following ingredients, as the percentage by weight indicates, were mixed at room temperature: (For examples 2-13 and 16-18).

EXAMPLE 2

Defoaming composition:
40.0% Polybutene (L-14)
10.0% PEG 400 DO
50.0% PEG 600 DO
Dilute to 10% with water.

EXAMPLE 3

Defoaming composition:
50.0% Polybutene (L-14)
45.0% PEG 600 DO
5.0% PEG 400 DO
Dilute to 10% with water.

EXAMPLE 4

Defoaming composition:
45.0% Polybutene (L-14)
48.0% PEG 600 DO
7.0% PEG 400 DO
Dilute to 10% with water.

EXAMPLE 5

Defoaming composition:
(From U.S. Pat. No. 3,959,175)
97.5% Polybutene
2.5% Silica
Dilute to 10% with water.

EXAMPLE 6

Defoaming composition:
100.0% PEG 600 DO
Dilute to 10% with water.

EXAMPLE 7

Defoaming composition:
100.0% PEG 400 DO
Dilute to 10% with water.

EXAMPLE 8

Defoaming composition:
55% Deodorized Herring Oil
15% Polybutene L-14
25% PEG 600 DO
5% Oleic Diethanolamide
Dilute to 10% with water.

EXAMPLE 9

Defoaming composition:
75% Deodorized Herring Oil
25% PEG 600 DO
Dilute to 10% with water.

EXAMPLE 10

40% Polybutene (L-14)
12% Oleic Diethanolamide
48% PEG 600 DO
Dilute to 10% with water.

EXAMPLE 11

Defoaming composition:
40% Polybutene (L-14)
53% PEG 600 DO
7% PEG 400 DO
Dilute to 10% with water.

EXAMPLE 12

A commercially available defoamer containing ethylenebisstearamide.

EXAMPLE 13

Defoaming composition:
100.0% Polybutene (L-14)

EXAMPLE 14

Defoaming composition:
(From U.S. Pat. No. 3,959,175)
2.7% Fatty amide (behanamide)
2.3% Hydrophobic silica
0.4% Silicone oil (dimethyl polysiloxane)
44.6% Mineral oil
50.0% Polybutene

EXAMPLE 15

Defoaming composition:
(From U.S. Pat. No. 3,959,175)
5.0% Fatty amide (stearamide)
95.0% polybutene

EXAMPLE 16

Defoaming composition:
50 0% Soybean oil
5.0% Polybutene (L-14)
35.0% PEG 600 DO
Diluted to 10% with water

EXAMPLE 17

Dilute example #14 to 10% with water

EXAMPLE 18

Dilute Example #15 to 10% with water
Synthetic white water was used as the foaming medium. The test procedure is as defined above.

TABLE I

Defoamer Efficacy for Examples 1-18

| Composition of | PPM | T/°F. | Time in seconds to overflow, i.e. time required for foam to exceed 290 cm |
|---|---|---|---|
| Example 1 (Control) | — | 125 | 12 |
| Example 2 | 15 | 120 | 250+ |
| Example 2 | 15 | 120 | 250+ |
| Example 3 | 15 | 130 | 234 |
| Example 4 | 45 | 130 | 161 |
| Example 5 | 91 | 130 | 19 |
| Example 6 | 45 | 130 | 150 |
| Example 7 | 45 | 130 | 96 |
| Example 8 | 15 | 120 | 250+ |
| Example 8 | 12 | 130 | 196 |
| Example 9 | 45 | 130 | 54 |
| Example 10 | 15 | 130 | 250+ |
| Example 10 | 30 | 140 | 242 |
| Example 11 | 15 | 130 | 250+ |
| Example 12 | 45 | 140 | 67 |
| Example 13 | 30 | 130 | 12 |
| Example 14 | 30 | 130 | 12 |
| Example 15 | 30 | 130 | 11 |
| Example 16 | 30 | 130 | 250+ |
| Example 16 | 7 | 130 | 220 |
| Example 17 | 30 | 130 | 11 |
| Example 18 | 30 | 130 | 9 |

As is evident from the above table, compositions according to the present invention (Examples 2, 3, 4, 8, 10, 11 and 16) exhibit improved foam control characteristics when compared to conventional treatment programs. Examples taken from U.S. Pat. No. 3,959,175 (5, 14 and 15) fared very poorly, foaming to overflow in 19, 11 and 11 seconds, respectively. Testing performed with the compounds individually, even polybutene, (Examples 6, 7 and 13, respectively) resulted in poor performance. Combining two compounds without the polybutene as shown in Example 9, failed to improve results. Also, the conventional commercially available defoamer ethylenebisstearamide exhibited poor performance. Only the combination of polybutene and various PEG esters according to the present invention presented acceptable efficacy.

Additional samples were prepared as shown below and compared with the medium of Example 19.

EXAMPLE 19

Simulated acid fine paper white water contains the following ingredients with respect to percentage by volume as listed:

| | |
|---|---|
| Tap Water | 24.97% |
| Deionized Water | 72.89% |
| 5% Rosin | 1.00% |
| 5% Starch | 0.35% |
| 3% $Al_2(SO_4)_3 \cdot 13H_2O$ | 0.60% |
| 37% Formaldehyde | 0.025% |

Let mix, then add:

| | |
|---|---|
| Microcrystalline cellulose | 0.17% |
| Clay | 0.06% |

Heat to the desired temperature and lower pH with 4N $H_2SO_4$. For Examples 19, 20, 21, and 22 the pH range was 4.5–4.9.

The following ingredients, as the percentage by weight indicates, were mixed at room temperature.

EXAMPLE 20

Defoaming Composition
40% Polybutene (L-14)
53% PEG 600 00
7% PEG 400 DO
Dilute to 10% with water

EXAMPLE 21

Defoaming Composition
50% Soybean Oil
Polybutene (L-14)
35% PEG 600 DO
Dilute to 10% with water

EXAMPLE 22

Defoaming Composition
25% Pluronic L-92
50% PEG 600 DO
20% Polybutene (L-14)
5% Long chain unsaturated fatty alcohol
Dilute to 10% with water Acid fine synthetic white water was used as the foaming medium. The test procedure is as defined above.

TABLE II

Defoamer Efficacy for Examples 19-22

| Composition of | PPM | T/°F. | Time in seconds to overflow, i.e. time required for foam to exceed 290 cm |
|---|---|---|---|
| Example 19 (Control) | — | 110–130 | 12 |
| Example 20 | 75 | 110 | 133 |
| Example 21 | 75 | 110 | 158 |
| Example 22 | 75 | 110 | 200+ |
| Example 20 | 75 | 130 | 139 |
| Example 21 | 75 | 130 | 202 |
| Example 22 | 75 | 130 | 200+ |
| Example 20 | 105 | 130 | 168 |

TABLE II-continued

Defoamer Efficacy for Examples 19-22

| Composition of | PPM | T/°F. | Time in seconds to overflow, i.e. time required for foam to exceed 290 cm |
|---|---|---|---|
| Example 21 | 105 | 120 | 200+ |
| Example 22 | 105 | 130 | 200+ |

The two following tests were conducted on actual white water from a production mill.

EXAMPLE 23

The medium used for testing examples 24 to 26 was obtained on site from a commercial fine paper mill. The medium was clear white water wherein the pH=7.8 and temperature=120° F.

The following ingredients, as the percentage by weight indicates, were mixed at room temperature.

EXAMPLE 24

Defoaming composition:
40% Polybutene (L-14)
53% PEG 600 DO
7% PEG 400 DO
Dilute to 10% with water

EXAMPLE 25

Defoaming composition:
50% Soybean Oil
15% Polybutene (L-14)
35% PEG 600 DO
Dilute to 10% with water

EXAMPLE 26

A commercially available defoamer containing high melting point fatty alcohol.

TABLE III

Defoamer Efficacy for Examples 23 to 26

| Composition of | PPM | T/°F. | Time in seconds to overflow, i.e. time required for foam to exceed 290 cm |
|---|---|---|---|
| Example 23 (Control) | — | 120 | 16 |
| Example 24 | 60 | 120 | 175 |
| Example 25 | 60 | 120 | 164 |
| Example 26 | 60 | 120 | 45 |

The following ingredients, as the percentage by weight indicates, were mixed at room temperature.

EXAMPLE 27

The medium used for testing Examples 28 to 30 was obtained on site from a second commercial fine paper mill. The medium was clear white water with pH=78.2, T=110°.

EXAMPLE 28

Defoaming composition:
40% polybutene (L-14)
53% PEG 600 DO
7% PEG 400 DO
Dilute to 10% with water

EXAMPLE 29

Defoaming composition:
50% soybean oil
15% polybutene (L-14)
35% PEG 600 DO
Dilute to 10% with water

EXAMPLE 30

A commercially available defoamer containing high point fatty alcohol.

TABLE IV

Defoamer Efficacy for Examples 27 to 30

| Composition of | PPM | T/°F. | Time in seconds to overflow, i.e. time required for foam to exceed 290 cm |
|---|---|---|---|
| Example 27 (Control) | — | 110 | 9 |
| Example 28 | 30 | 110 | 217 |
| Example 29 | 30 | 110 | 223 |
| Example 30 | 30 | 110 | 139 |

An additional benefit which will become evident to one practicing the method of the present invention is a reduction in the formation of deposits which often accompanies the use of conventional foam control treatment chemicals.

The following test was performed to compare the deposition potential of the present invention to other known treatment programs. The treatment followed was to soak 3.5 g of bleached Kraft Pulp in 200 ml of deionized waters and add the mixture to a conventional laboratory Oster Mini-jar. Next, 0.3 ml of the selected defoamer was added. A pre-weighed donut shaped plastic disc is installed around the base of the Oster blender blade, both of which are then inserted into the jar. After sealing, the blender is operated for one minute at its lowest setting. Once the disc is removed from the Jar, it is rinsed to remove excess pulp slurry, allowed to dry overnight and then weighed to determine the amount of deposition, if any.

Table V shows the amount of deposition, in milligrams, of the various defoamer treatments tested.

TABLE V

Deposition Potential

| Percent Solution | Defoamer | Deposition |
|---|---|---|
| 100% | 2.7% fatty amide (behenamide) 2.3% hydrophobic silica 0.4% dimethyl polysiloxane) 44.6% mineral oil 50.0% polybutene (Example I of U.S. 3,959,175) | 6.7 mg |
| 3% | solution of ethylenebisstearamide in oil | 3.45 mg |
| 100% | 5.0% fatty amide (stearamide) 95.0% polybutene (Example VIII of U.S. 3,959,175) | 1.70 mg |
| 13% | High melting point fatty alcohol | 0.15 mg |
| 100% | 40.0% polybutene 12.0% oleic diethanolamide 48.0% PEG 600 DO | 0.15 mg |
| 100% | 50.0% soybean oil 15.0% polybutene 35.0% PEG 600 DO | 0.05 mg |
| 10% | Example I of U.S. 3,959,175 | 0.00 mg |
| 10% | 50.0% soybean oil 15.0% polybutene 35.0% PEG 600 DO | −0.05 mg |
| 100% | 40.0% polybutene 53.0% PEG 600 DO | −0.05 mg |

TABLE V-continued

| Percent Solution | Defoamer | Deposition |
|---|---|---|
| 10% | 7.0% PEG 400 DO 55.0% deodorized herring oil 15.0% polybutene 25.0% PEG 600 DO 5.0% PEG 400 DO | −0.05 mg |
| 100% | (same as previous defoamer) | −0.05 mg |
| 10% | 40.0% polybutene 12.0% oleic diethanolamide 48.0% PEG 600 DO | −0.05 mg |
| 10% | (Example VII of U.S. 3,959,175) | −0.10 mg |
| 10% | 40.0% polybutene 53.0% PEG 600 DO 7.0% PEG 400 DO | −0.10 mg |

The most substantial deposition occurs with 100% solutions of Examples I and VIII of Patent 3,959,175 and a 3% solution of the conventional treatment ethylenebisstearamide. Only when reduced to a 10% solution does the composition of the patent exhibit the low deposition values of the present invention. However, referring back to Table I, diluting these compositions to reduce deposition potential is inconsequential since neither the 100% solutions (Examples 14 and 15, Table I) nor the 10% solution (Examples 5, 17 and 18 Table I) provide the necessary foam control characteristics to be considered efficacious as foam control agents.

In accord with the patent statutes, the best mode has been set forth. However, it will be apparent to those skilled in the art that many modifications can be made without departing from the invention herein disclosed and described, the scope of the invention being limited solely by the scope of the attached claims.

We claim:

1. A stable defoamer composition comprising form about 10 to about 60 percent, by weight, of polybutene and from about 40 to about 90 percent, by weight, of at least one surfactant having a melting point less than 20° C., diluted up to 10% with water, wherein said surfactant is selected from the group consisting of polyethylene glycol dioleate, polyethylene glycol ditallate, sorbitan ester and oleic diethanolamide.

2. The composition of claim 1 wherein said polybutene has a number average molecular weight of between 300 to 3,000.

3. The composition of claim 2 wherein said polybutene has a number average molecular weight of between 300 and 400.

4. The composition of claim 1 further comprising at least one fatty triglyceride.

5. The composition of claim 4 wherein said fatty triglyceride is selected from the group consisting of herring oil and soybean oil.

* * * * *